United States Patent
Liu et al.

(10) Patent No.: US 10,958,726 B2
(45) Date of Patent: Mar. 23, 2021

(54) METHOD OF SYNCHRONIZING DEVICE LIST IN A SMART NETWORK SYSTEM, APPARATUS, AND COMPUTER STORAGE MEDIUM THEREOF

(71) Applicant: BAIDU ONLINE NETWORK TECHNOLOGY (BEIJING) CO., LTD., Beijing (CN)

(72) Inventors: Cheng Liu, Beijing (CN); Lei Zhong, Beijing (CN); Jing Zhao, Beijing (CN); Ming Wang, Beijing (CN); Ben Xu, Beijing (CN); Dongmin Ma, Beijing (CN); Yafei Miao, Beijing (CN); Wanjing Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 538 days.

(21) Appl. No.: 15/858,646

(22) Filed: Dec. 29, 2017

(65) Prior Publication Data
US 2019/0149601 A1    May 16, 2019

(30) Foreign Application Priority Data
Nov. 16, 2017   (CN) .......................... 201711140350.8

(51) Int. Cl.
*H04L 29/08*   (2006.01)
*H04L 29/06*   (2006.01)
*H04L 12/24*   (2006.01)

(52) U.S. Cl.
CPC .......... *H04L 67/1095* (2013.01); *H04L 41/28* (2013.01); *H04L 63/08* (2013.01); *H04L 63/10* (2013.01); *H04L 63/101* (2013.01)

(58) Field of Classification Search
CPC .... G06F 16/9535; H04W 48/08; H04L 67/16; H04L 63/10; H04L 63/101; H04L 63/08; H04L 67/1095
(Continued)

(56) References Cited

U.S. PATENT DOCUMENTS

| 2003/0051009 | A1 | 3/2003 | Shah et al. | |
| 2004/0088695 | A1* | 5/2004 | Kawano | G06F 8/65 717/171 |

(Continued)

FOREIGN PATENT DOCUMENTS

| CN | 101568189 A | 10/2009 |
| CN | 102004987 A | 4/2011 |

(Continued)

OTHER PUBLICATIONS

First Office Action and Search Report from CN app. No. 201711140350. 8, dated Feb. 25, 2019, with English translation from Global Dossier.

(Continued)

*Primary Examiner* — Bryan F Wright
(74) *Attorney, Agent, or Firm* — Ladas & Parry, LLP

(57) ABSTRACT

The present disclosure provides a device list synchronizing method and apparatus, a device and a computer storage medium, wherein the method comprises: after obtaining a user instruction instructing to discover devices, a smart network system sending, to a developer system, a DeviceDiscoveryRequest including first authorization information; the developer system storing the first authorization information; after obtaining information of update of a device list on a developer side, carrying the first authorization information to invoke an interface of the smart network system to trigger the smart network system to send the DeviceDiscoveryRequest to the developer system. In the manners provided by (Continued)

the present disclosure, it is possible to implement automatic synchronization of the cloud user data of the smart network system after the device list on the developer side is subsequently updated, in a way that the user only needs to initiatively trigger discovering devices once, needless to initiatively trigger discovering devices each time.

21 Claims, 5 Drawing Sheets

(58) Field of Classification Search
USPC .......................................................... 726/6
See application file for complete search history.

(56) References Cited

U.S. PATENT DOCUMENTS

| | | | | |
|---|---|---|---|---|
| 2005/0268307 | A1* | 12/2005 | Gates | G06F 16/182 |
| | | | | 719/315 |
| 2007/0162518 | A1* | 7/2007 | Tian | H04L 9/3242 |
| 2010/0144342 | A1* | 6/2010 | Kondo | H04W 48/08 |
| | | | | 455/432.1 |
| 2014/0207818 | A1* | 7/2014 | Jellick | G06F 16/23 |
| | | | | 707/771 |
| 2015/0370615 | A1* | 12/2015 | Pi-Sunyer | G05D 23/1917 |
| | | | | 700/276 |
| 2016/0085516 | A1* | 3/2016 | Ben-Tzur | G06F 16/9535 |
| | | | | 717/109 |
| 2016/0357524 | A1* | 12/2016 | Maluf | G06F 8/34 |

FOREIGN PATENT DOCUMENTS

| | | |
|---|---|---|
| CN | 105282234 A | 1/2016 |
| CN | 105847421 A | 8/2016 |
| CN | 106685776 A | 5/2017 |

OTHER PUBLICATIONS

Second Office Action from CN app. Mo. 201711140350.8, dated 201711140350.8, dated Apr. 30, 2019, with machine English translation from Google Translate.

* cited by examiner

METHOD OF SYNCHRONIZING DEVICE LIST IN A SMART NETWORK SYSTEM, APPARATUS, AND COMPUTER STORAGE MEDIUM THEREOF

CROSS REFERENCE TO RELATED APPLICATION

The present application claims priority to Chinese Patent Application No. 201711140350.8, filed on Nov. 16, 2017, with the title of "Device list synchronizing method and apparatus, device, and computer storage medium", the disclosure of which is hereby incorporated herein by reference in its entirety.

FIELD OF THE DISCLOSURE

The present disclosure relates to the technical field of computer application, and particularly to a device list synchronizing method and apparatus, a device and a computer storage medium.

BACKGROUND OF THE DISCLOSURE

As artificial intelligence develops and an era of Internet of things comes, conventional hardware devices transform towards intelligentization. Under a household scenario, an interaction manner between a user and a device also changes revolutionarily from a physical button for contacting the device to conveyance of a demand through an application gesture operation and then through a speech instruction nowadays, to implement control of smart household device.

A typical application scenario is that if a new user equipment joins a smart household network, and if the user hopes to synchronize a device list on a developer side to the smart household network, the user needs to initiatively trigger the function of "discovering devices" to obtain a new device list from the developer side (the "developer" in embodiments of the present disclosure refers to a developer of a user equipment which newly joins the smart household network), and automatic update of the device list cannot be achieved.

SUMMARY OF THE DISCLOSURE

In view of the above, the present disclosure provides a device list synchronizing method and apparatus, a device and a computer storage medium, to facilitate automatic update of a device list on a developer side to a smart network system.

Specific technical solutions are as follows:

The present disclosure provides a device list synchronizing method, comprising:

a developer system receives a DeviceDiscoveryRequest including first authorization information, the DeviceDiscoveryRequest being sent by a smart network system to the developer system after obtaining a user instruction instructing to discover devices;

the developer system stores the first authorization information;

after obtaining information of update of a device list on a developer side, carrying the first authorization information to invoke an interface of the smart network system to trigger the smart network system to send the DeviceDiscoveryRequest to the developer system.

According to a specific implementation mode of the present disclosure, the DeviceDiscoveryRequest carries second authorization information provided by the developer in advance;

the method further comprises:

the developer system, after receiving the DeviceDiscoveryRequest, obtains the device list on the developer side corresponding to the second authorization information, and returns the device list on the developer side to the smart network system.

According to a specific implementation mode of the present disclosure, the developer system storing the first authorization information comprises:

the developer system storing a correspondence relationship of the first authorization information and second authorization information;

the carrying the first authorization information to invoke an interface of the smart network system after obtaining the information of update of the device list on a developer side comprises:

after obtaining the information of update of the device list corresponding to the second authorization information, carrying the first authorization information to invoke the interface of the smart network system according to the correspondence relationship.

According to a specific implementation mode of the present disclosure, the first authorization information comprises user identification information or encrypted user identifier information.

The present disclosure provides a device list synchronizing method, comprising:

after obtaining a user instruction instructing to discover devices, a smart network system sends, to a developer system, a DeviceDiscoveryRequest including first authorization information so that the developer system stores the first authorization information;

after receiving an invocation including the first authorization information and sent by the developer system after a device list on a developer side is updated, sending the DeviceDiscoveryRequest to the developer system.

According to a specific implementation mode of the present disclosure, the method further comprises:

after the smart network system receives the device list on the developer side from the developer system, using the device list on the developer side to update cloud user data of the system.

According to a specific implementation mode of the present disclosure, the DeviceDiscoveryRequest sent to the developer system carries second authorization information provided by the developer in advance;

the device list on the developer side corresponds to the second authorization information.

According to a specific implementation mode of the present disclosure, the method further comprises:

returning a message about success or failure of update to user equipment sending the user instruction, according to an update result of cloud user data of the system.

According to a specific implementation mode of the present disclosure, the first authorization information comprises user identification information or encrypted user identifier information.

The present disclosure provides a device list synchronizing apparatus arranged at a developer system, the apparatus comprising:

a first receiving unit configured to receive a DeviceDiscoveryRequest including first authorization information, the DeviceDiscoveryRequest being sent by a smart network system to the developer system after obtaining a user instruction instructing to discover devices;

a storing unit configured to store the first authorization information;

an obtaining unit configured to obtain information of update of a device list on a developer side;

an invoking unit configured to, after the obtaining unit obtains the information of update of the device list on the developer side, carry the first authorization information to invoke an interface of the smart network system to trigger the smart network system to send the DeviceDiscoveryRequest to the developer system.

According to a specific implementation mode of the present disclosure, the DeviceDiscoveryRequest carries second authorization information provided by the developer in advance;

the obtaining unit is further configured to, after the first receiving unit receives the DeviceDiscoveryRequest, obtain the device list on the developer side corresponding to the second authorization information;

the apparatus further comprises:

a first sending unit configured to return the device list on the developer side to the smart network system.

According to a specific implementation mode of the present disclosure, the storing unit is specifically configured to store a correspondence relationship of the first authorization information and second authorization information;

the invoking unit is specifically configured to, after the obtaining unit obtains the information of update of the device list corresponding to the second authorization information, carry the first authorization information to invoke the interface of the smart network system according to the correspondence relationship.

According to a specific implementation mode of the present disclosure, the first authorization information comprises user identification information or encrypted user identifier information.

The present disclosure provides a device list synchronizing apparatus arranged at a smart network system, the apparatus comprising:

a second receiving unit configured to receive a user instruction instructing to discover devices;

a sending unit configured to send, to a developer system, a DeviceDiscoveryRequest including first authorization information so that the developer system stores the first authorization information;

a third receiving unit configured to receive an invocation including the first authorization information and sent by the developer system after a device list on a developer side is updated;

the second sending unit further configured to, after the third receiving unit receives the invocation, send the DeviceDiscoveryRequest to the developer system.

According to a specific implementation mode of the present disclosure, the third receiving unit is further configured to receive the device list on the developer side from the developer system;

The apparatus further comprises:

an updating unit configured to use the device list on the developer side to update cloud user data of the system.

According to a specific implementation mode of the present disclosure, the DeviceDiscoveryRequest sent by the second sending unit to the developer system carries second authorization information provided by the developer in advance;

The device list on the developer side corresponds to the second authorization information.

According to a specific implementation mode of the present disclosure, the apparatus further comprises:

a fourth sending unit configured to return a message about success or failure of update to user equipment sending the user instruction, according to an update result of cloud user data of the system.

According to a specific implementation mode of the present disclosure, the first authorization information comprises user identification information or encrypted user identifier information.

The present disclosure further provides a device, comprising:

one or more processors;

a memory for storing one or more programs;

when said one or more programs are executed by said one or more processors, said one or more processors are enabled to implement the aforesaid method.

The present disclosure provides a storage medium including a computer-executable instruction, wherein the computer-executable instruction, when executed by a computer processor, is used to implement the aforesaid method.

It is known from the above technical solutions that in the manners provided by the present disclosure, it is possible to implement automatic synchronization of the cloud user data of the smart network system after the device list on the developer side is subsequently updated, in a way that the user only needs to initiatively trigger discovering devices once, needless to initiatively trigger discovering devices each time.

DETAILED DESCRIPTION OF PREFERRED EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when . . . (stated condition or event) is detected" or "responsive to detecting (stated condition or event)".

A core idea of the present disclosure lies in that when the user initiatively triggers discovering devices, a device discovery request sent by the smart network system carries authorization information so that after the device list on the developer side is updated, the authorization information can be used to trigger the smart network system to send the device discovery request to implement automatic synchronization of the device list without requiring the user to trigger initiatively.

Figure 1:
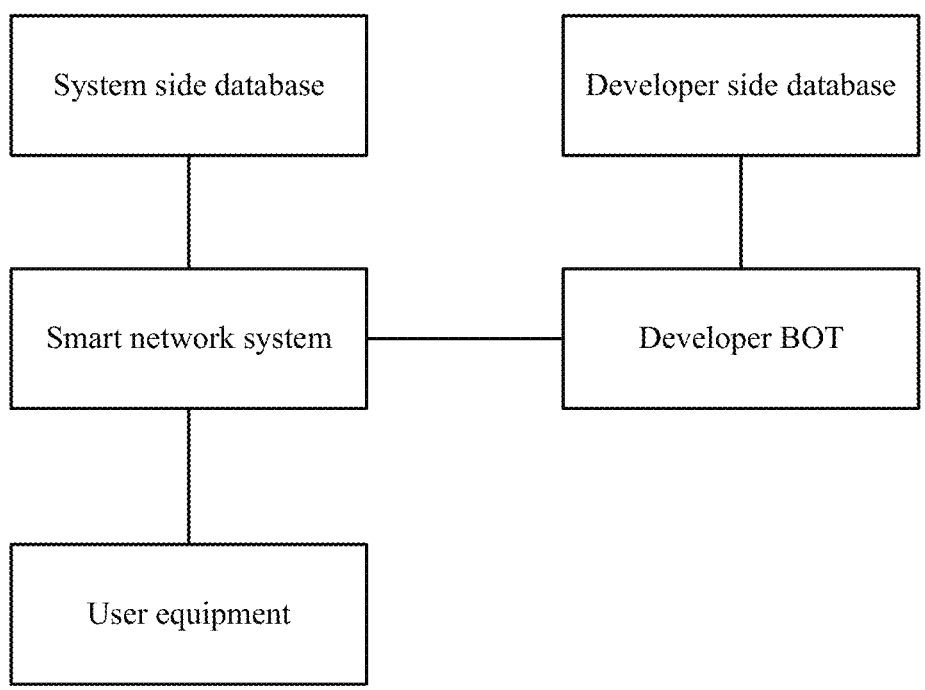
FIG. 1 is a structural schematic diagram of a system according to an embodiment of the present disclosure.

To facilitate understanding of embodiments of the present disclosure, first, the structure of a system involved in the present disclosure is introduced briefly. FIG. 1 is a structural schematic diagram of a system according to an embodiment of the present disclosure. As shown in FIG. 1, the system mainly comprises: user equipment, a smart network system, a system side database, a developer BOT and a developer side database.

The user equipment is a user equipment accessed to the smart network system, and at least comprises a smart user equipment that can interact with the user and send a user instruction to the smart network system, for example, a smart acoustic enclosure, a mobile phone, a smart TV set or the like. One of this type of equipment in subsequent embodiments is called a master device.

The smart network system is a cloud system for the user equipment to access the smart network, and can interact with the user equipment and perform management and control of the user equipment.

The system side database is a database of the smart network system, and at least comprises user data of the smart network.

The developer BOT is a developer system and may be arranged at a developer side application server. A function subject involved in the present disclosure may be embodied as an application in the application server or a plug-in in the application, and is responsible for completing connection of the developer side and the smart network system. The "developer" involved in embodiments of the present disclosure is a developer of the user equipment in the smart network.

The developer side database at least comprises a device list on the developer side. Once a new user equipment joins the smart network, it is necessary to, during the joining, configure the developer's authorization information (called second authorization information in subsequent embodiments of the present disclosure) and comply with a certain protocol to implement the join of the user equipment into the smart network, so the device list on the developer side is updated in real time. That is to say, once a new user equipment joins the smart network, the user equipment's information will be added in time to the device list on the developer side corresponding to the user equipment. A problem to be solved by the present disclosure is how to automatically synchronize the updated device list on the developer side to the smart network system side.

Figure 2:
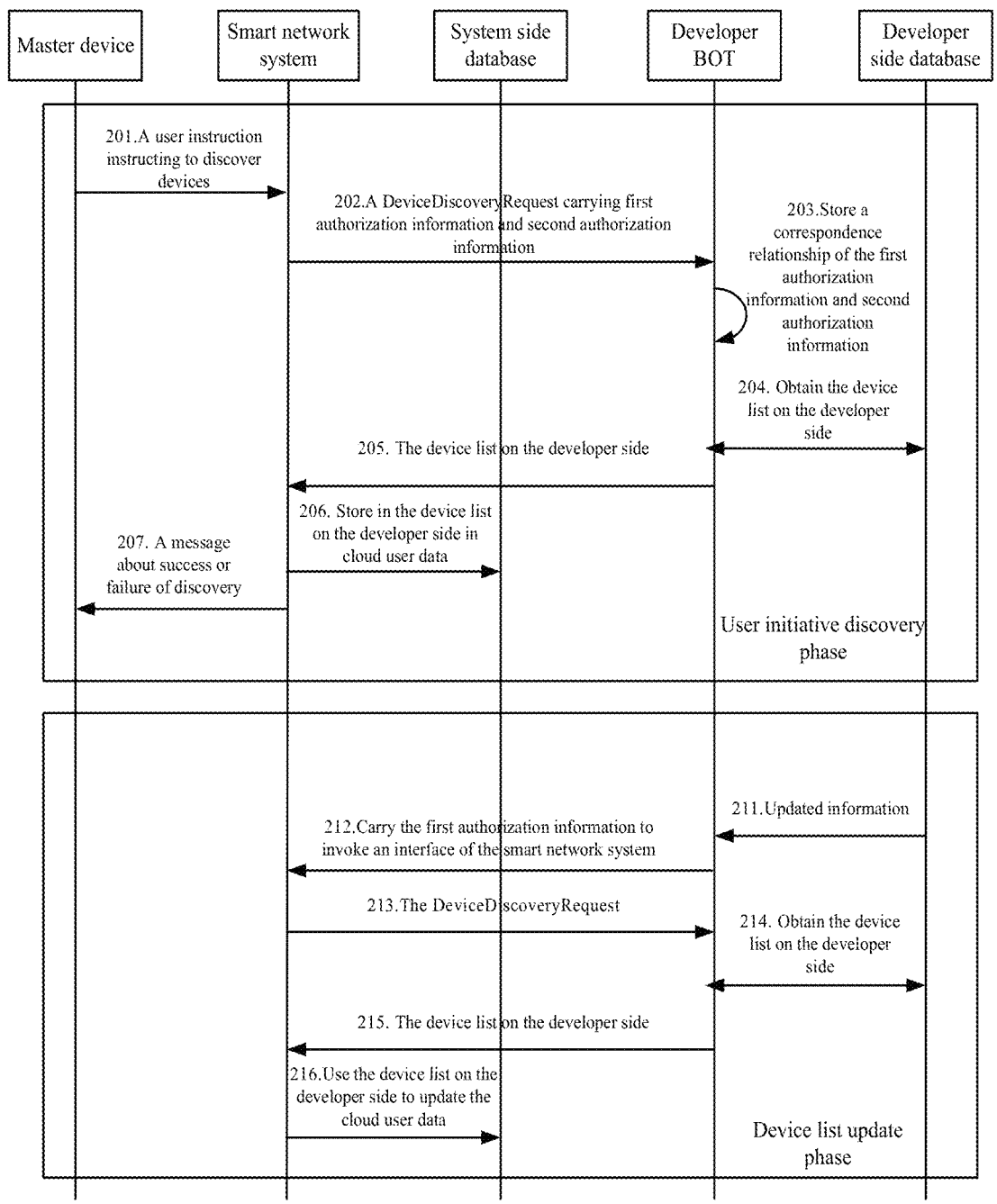
FIG. 2 is a flow chart of a method according to an embodiment of the present disclosure.

FIG. 2 is a flow chart of a method according to an embodiment of the present disclosure. The flow chart mainly comprises two phases: a user initiative discovery phase and a device list update phase. As shown in FIG. 2, the user initiative discovery phase may comprise the following steps:

In 201, the master device sends a user instruction instructing to discover devices to the smart network system.

It needs to be appreciated that it is possible to execute the flow of the user initiative discovery phase when the user initiatively triggers the procedure of discovering the device for the first time, and execute the flow of the user initiative discovery phase when the user initiatively triggers the procedure of discovering the device each time. The present disclosure does not limit this.

In this step, the user may send the user instruction to the master device. The user instruction may be a speech instruction, for example, the user sends a speech instruction of "discovering devices" to the smart acoustic enclosure. The user instruction may be a gesture operation instruction, for example, the user triggers the instruction of "discovering devices" by inputting a specific gesture on the mobile phone's specific interface. The user instruction may also be an instruction triggered by a physical button, for example, the user triggers an automatic discovery instruction by pressing a physical button on a remote controller of a smart TV set. Certainly, it is further possible to employ other instruction dispatching manners, which will not be exhausted herein.

In 202, the smart network system sends to the developer BOT a DeviceDiscoveryRequest carrying first authorization information and second authorization information.

After receiving the user instruction of the master device, the smart network system sends the DeviceDiscoveryRequest carrying first authorization information and second authorization information to the developer BOT corresponding to the developer for which the smart network system has already been authorized.

In the embodiment of the present disclosure, the developer of each user equipment may authorize the smart network system in advance so that the developer can be connected with the smart network system and the developed user equipment can access the smart network. The developer may provide the second authorization information to the smart network system in advance. The smart network system, after receiving the user instruction of the master device, may send, to each developer BOT, an automatic discovery request carrying the second authorization information provided by the corresponding developer.

The second authorization information may be information such as a developer identifier, a token or a specific password. The present disclosure does not limit the form of the second authorization information. The specific form may be pre-agreed by the developer and the smart network system.

The first authorization information is provided by the smart network system to the developer BOT and used to authorize the developer BOT. The first authorization information may also be in many forms. In the embodiment of the present disclosure, preferably the user identifier or encrypted user identifier is used as the first authorization information. For example, after registering at the smart network system, the user obtains the user identifier, and subsequently the user uses the user identifier to add all user equipment to the smart network. Hence, the user identifier may be used to identify the user's user equipment added to the smart network, and may be understood as a system account.

In 203, the developer BOT stores a correspondence relationship of the first authorization information and second authorization information.

The developer BOT, after receiving the DeviceDiscoveryRequest, parses to obtain the first authorization information and second authorization information, wherein the second authorization information is authorization information provided by the developer, and the first authorization information is authorization information provided by the smart network system. Hence, the developer BOT stores the two authorization information respectively to obtain authorization of the smart network system on the one hand, and communicate "account numbers" of the two systems on the other hand.

In 204, the developer BOT obtains, from the developer side database, the device list corresponding to the second authorization information, namely, the device list on the developer side.

Since the second authorization information is provided by the developer side, the user, upon joining the smart network, needs to configure the developer's second authorization information and comply with a certain protocol to achieve the user equipment's join into the smart network. Hence, once a new user equipment joins the smart network, the user equipment's information will be added in time to the device list on the developer side corresponding to the user equipment, and the identifier of the second authorization information is employed. The developer BOT can use the second authorization information to obtain the corresponding device list from the developer side database.

In 205, the developer BOT returns the device list on the developer side to the smart network system.

After obtaining the device list corresponding to the second authorization information, the developer BOT may return the device list carried in DeviceDiscoveryResponse to the smart network system.

In 206, the smart network system stores in the device list on the developer side in cloud user data in the system side database.

If in this phase, the user initiatively triggers discovering the device for the first time, the smart network system stores the device list on the developer side in the user data of the system side database. If the user does not trigger for the first time, the device list on the developer side may be used to update the user data in the system database.

In 207, the smart network system returns a message about success or failure of discovery to the master device.

If steps before step 207 are all executed successfully, a message about success of discovery is returned to the master device. If one step is executed unsuccessfully before step 207, the discovery flow cannot be performed smoothly, and a message about failure of discovery may be returned to the smart network system.

If subsequently new devices join the smart network and the device list on the developer side is updated, the device list update phase is executed as follows:

In 211, the developer BOT obtains information of update of developer device list.

After the device list in the developer side database is updated, an update notification will be sent to the developer BOT, and the notification can carry the second authorization information corresponding to the device list.

In 212, the developer BOT carries the first authorization information to invoke an interface of the smart network system according to a correspondence relationship between the first authorization information and second authorization information.

The smart network system may open an interface for the developer for invocation by the developer. When the developer BOT invokes the interface of the smart network system, it carries the first authorization information. In the embodiment of the present disclosure, the first authorization information employs a user identifier or encrypted user identifier, which functions to indicate that authorization has already been obtained from the smart network system on the one hand, and on the other hand, functions to identify the user corresponding to the updated device list.

In 213, the smart network system is triggered to send the DeviceDiscoveryRequest to the developer BOT, the DeviceDiscoveryRequest carrying the second authorization information.

After the interface of the smart network system is invoked, since the parameter carried by the invocation is the first authorization information and the smart network system can confirm the authorized developer BOT, the smart network system can be triggered to send the DeviceDiscoveryRequest to the developer BOT.

In 214, the developer BOT obtains, from the developer side database, the device list on the developer side corresponding to the second authorization information.

In 215, the developer BOT returns the device list on the developer side to the smart network system.

After the developer BOT obtains the device list corresponding to the second authorization information, it may return the device list carried in the DeviceDiscoveryResponse to the smart network system.

In 216, the smart network system uses the device list on the developer side to update the cloud user data in the system side database.

So far, execution of the automatic update procedure of the device list ends up. To enrich the user's experience, after step 216, the smart network system may further send a message about success or failure of update to the master device in the smart network.

The above describes the method according to the present disclosure, and an apparatus according to the present disclosure will be described in detail in conjunction with an embodiment.

Figure 3:
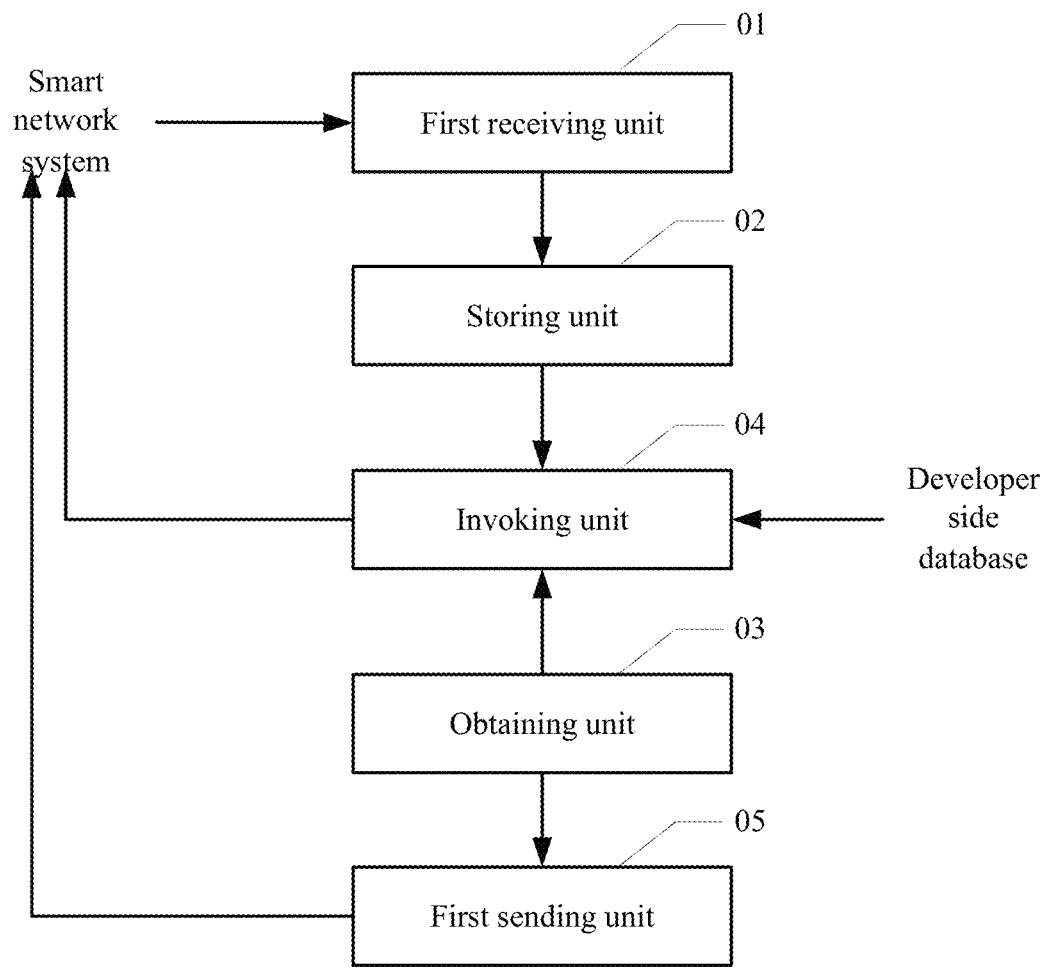
FIG. 3 is a structural schematic diagram of an apparatus arranged at a developer BOT according to an embodiment of the present disclosure.

FIG. 3 is a structural schematic diagram of an apparatus arranged at the developer BOT according to an embodiment of the present disclosure. The apparatus may be embodied as a function unit such as an application, a plug-in in the application or a Software Development Kit (SDK). As shown in FIG. 3, the apparatus may comprise: a first receiving unit 01, a storing unit 02, an obtaining unit 03 and an invoking unit 04, and may further comprise a first sending unit 05. Main functions of the units are as follows:

The first receiving unit 01 is configured to receive a DeviceDiscoveryRequest including first authorization information, the DeviceDiscoveryRequest being sent by the smart network system to the developer BOT after obtaining a user instruction instructing to discover devices.

The storing unit 02 is configured to store the first authorization information.

The first authorization information is provided by the smart network system to the developer BOT and used to authorize the developer BOT. The first authorization information may also be in many forms. In the embodiment of the present disclosure, preferably a user identifier or encrypted user identifier is used as the first authorization information. For example, after registering at the smart network system, the user obtains the user identifier, and subsequently the user uses the user identifier to add all user equipment to the smart network. Hence, the user identifier may be used to identify the user's user equipment added to the smart network, and may be understood as a system account.

The obtaining unit 03 is configured to obtain information of update of a device list on the developer side. After the obtaining unit 03 obtains the information of update of the device list on the developer side, the invoking unit 04 is configured to carry the first authorization information to invoke an interface of the smart network system to trigger the smart network system to send the DeviceDiscoveryRequest to the developer BOT.

The DeviceDiscoveryRequest carries second authorization information provided by the developer in advance. In the embodiment of the present disclosure, the developer of each user equipment may authorize the smart network system in advance so that the developer can be connected with the smart network system and the developed user equipment can access the smart network. The developer may provide the second authorization information to the smart network system in advance. The smart network system, after receiving the user instruction of the master device, may send, to each developer BOT, an automatic discovery request carrying the second authorization information provided by the corresponding developer.

The second authorization information may be information such as a developer identifier, a token or a specific password. The present disclosure does not limit the form of the second authorization information. The specific form may be pre-agreed by the developer and the smart network system.

After the first receiving unit 01 receives the DeviceDiscoveryRequest, the obtaining unit 03 obtains the device list on the developer side corresponding to the second authorization information, and specifically queries a developer side database and obtains the device list on the developer side.

The first sending unit 05 is configured to return the device list on the developer side obtained by the obtaining unit 03 to the smart network system.

In addition, after the first receiving unit 01 receives the DeviceDiscoveryRequest including the first authorization information and second authorization information, the storing unit 02 stores a correspondence relationship of the first authorization information and second authorization information. The second authorization information is authorization information provided by the developer, and the first authorization information is authorization information provided by the smart network system. Hence, the developer BOT stores the two authorization information respectively to obtain authorization of the smart network system on the one hand, and communicate "account numbers" of the two systems on the other hand.

After the obtaining unit 03 obtains the information of update of the device list corresponding to the second authorization information, the invoking unit 04 carries the first authorization information to invoke an interface of the smart network system according to a correspondence relationship.

After the device list in the developer side database is updated, an update notification will be sent to the developer BOT, and the notification can carry the second authorization information corresponding to the device list. The smart network system may open an interface for the developer for invocation by the developer. When the invoking unit 04 invokes the interface of the smart network system, it carries the first authorization information. In the embodiment of the present disclosure, the first authorization information employs a user identifier or encrypted user identifier, which functions to indicate that authorization has already been obtained from the smart network system on the one hand, and on the other hand, functions to identify the user corresponding to the updated device list.

Figure 4:
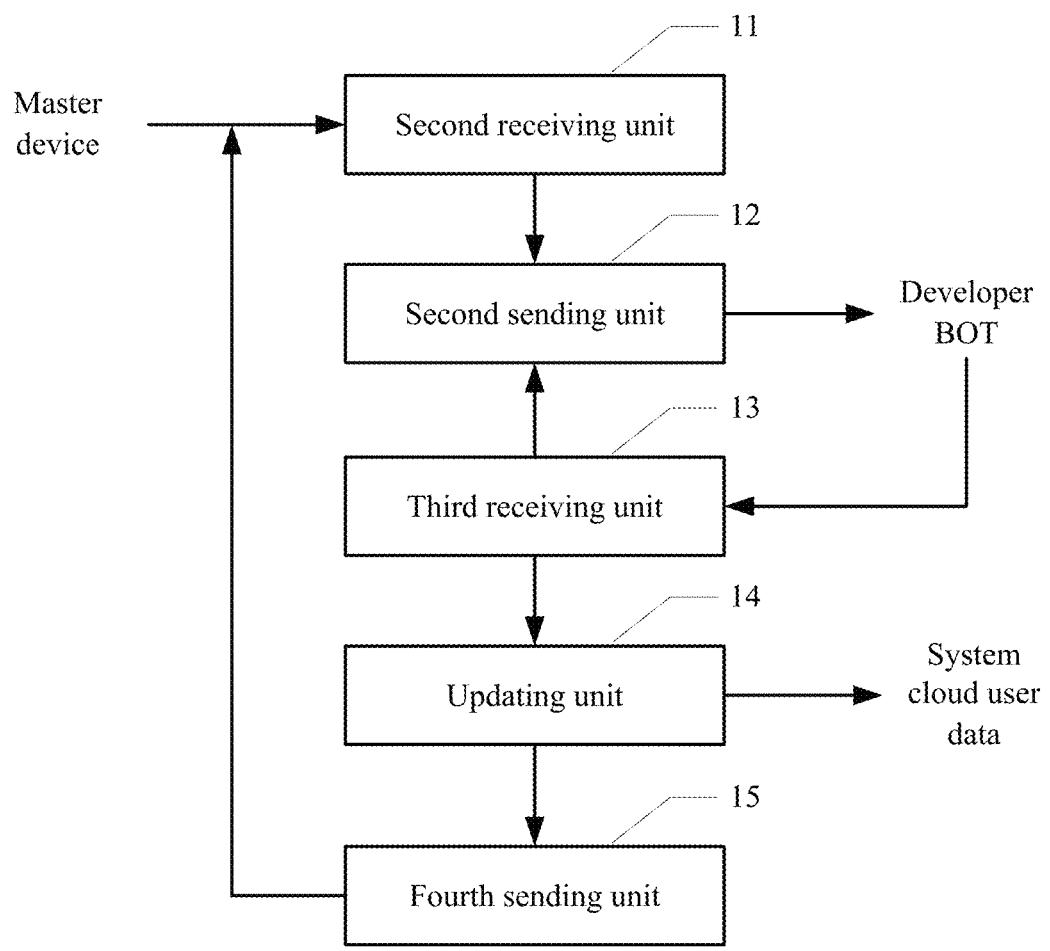
FIG. 4 is a structural schematic diagram of an apparatus arranged on a smart network system according to an embodiment of the present disclosure.

FIG. 4 is a structural schematic diagram of an apparatus arranged on a smart network system according to an embodiment of the present disclosure. The apparatus may be embodied as a function unit such as an application, a plug-in in the application or a Software Development Kit (SDK). As shown in FIG. 4, the apparatus may comprise: a second receiving unit 11, a second sending unit 12 and a third receiving unit 13, and may further comprise an updating unit 14 and a fourth sending unit 15. Main functions of the units are as follows:

The second receiving unit 11 is configured to receive a user instruction instructing to discover devices. It needs to be appreciated that the second receiving unit may receive the user instruction instructing to discover the device when the user initiatively triggers the procedure of discovering the device for the first time, and may receive the user instruction instructing to discover the device when the user initiatively triggers the procedure of discovering the device each time. The present disclosure does not limit this.

The user instruction may be a speech instruction, for example, the user sends a speech instruction of "discovering devices" to the smart acoustic enclosure. The user instruction may be a gesture operation instruction, for example, the user triggers the instruction of "discovering devices" by inputting a specific gesture on the mobile phone's specific interface. The user instruction may also be an instruction triggered by a physical button, for example, the user triggers an automatic discovery instruction by pressing a physical button on a remote controller of a smart TV set. Certainly, it is further possible to employ other instruction dispatching manners, which will not be exhausted herein.

The sending unit 12 is configured to send, to the developer BOT, the DeviceDiscoveryRequest including the first authorization information so that the developer BOT stores the first authorization information.

The first authorization information is provided by the smart network system to the developer BOT and used to authorize the developer BOT. The first authorization information may also be in many forms. In the embodiment of the present disclosure, preferably a user identifier or encrypted user identifier is used as the first authorization information. For example, after registering at the smart network system, the user obtains the user identifier, and subsequently the user uses the user identifier to add all user equipment to the smart network. Hence, the user identifier may be used to identify the user's user equipment added to the smart network, and may be understood as a system account.

In addition, the DeviceDiscoveryRequest sent by the second sending unit 12 to the developer BOT carries second authorization information provided by the developer in advance. In the embodiment of the present disclosure, the developer of each user equipment may authorize the smart network system in advance so that the developer can be connected with the smart network system and the developed user equipment can access the smart network. The developer may provide the second authorization information to the smart network system in advance. The smart network system, after receiving the user instruction of the master device, may send, to each developer BOT, an automatic discovery request carrying the second authorization information provided by the corresponding developer.

The second authorization information may be information such as a developer identifier, a token or a specific password. The present disclosure does not limit the form of the second authorization information. The specific form may be pre-agreed by the developer and the smart network system.

The third receiving unit 13 is configured to receive an invocation including the first authorization information and sent by the developer BOT after the device list on the developer side is updated.

The smart network system may open an interface for the developer for invocation by the developer. When the developer BOT invokes the interface of the smart network system, it carries the first authorization information. In the embodiment of the present disclosure, the first authorization information employs a user identifier or encrypted user identifier, which functions to indicate that authorization has already been obtained from the smart network system on the one hand, and on the other hand, functions to identify the user corresponding to the updated device list.

The second sending unit 12 is configured to, after the third receiving unit 13 receives the invocation, send the DeviceDiscoveryRequest to the developer BOT, wherein the DeviceDiscoveryRequest carries the second authorization information.

The third receiving unit 13 is configured to receive the device list on the developer side from the developer BOT. Specifically, it is possible to obtain the device list on the developer side from the DeviceDiscoveryResponse sent by the developer BOT.

The updating unit 14 is configured to use the device list on the developer side to update cloud user data of the system.

The fourth sending unit 15 is configured to return a message about success or failure of update to user equipment (namely, master device) sending the user instruction, according to an update result of cloud user data of the system.

Figure 5:
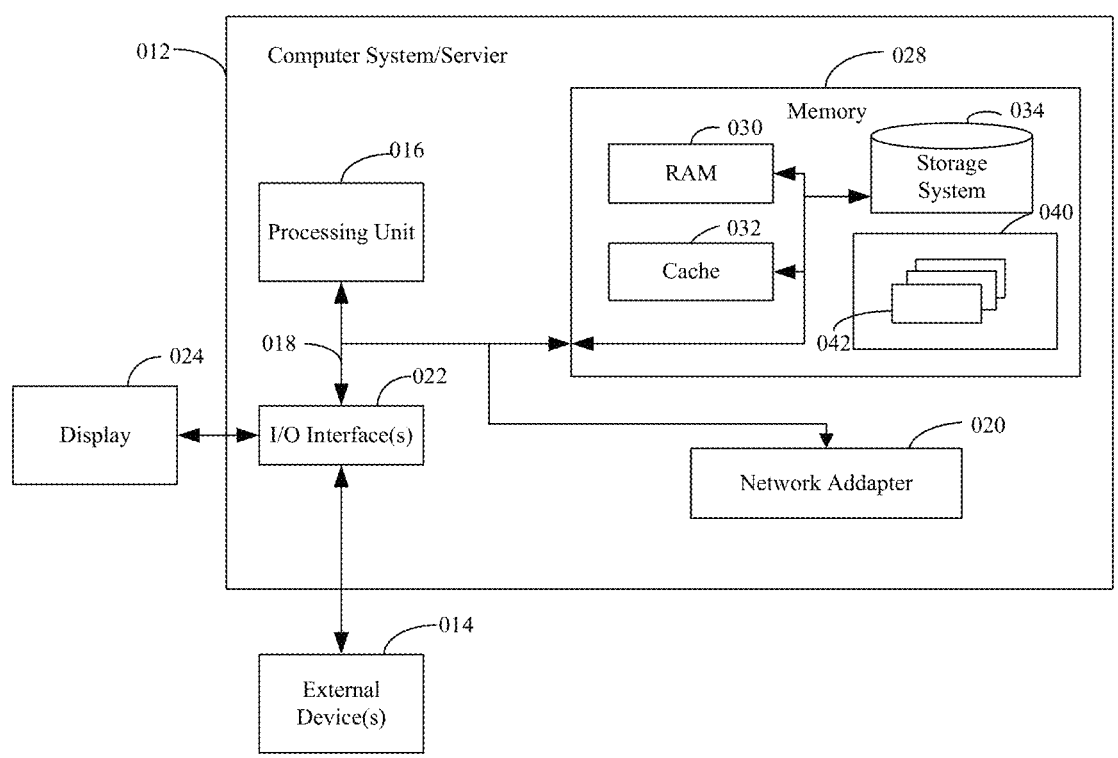
FIG. 5 illustrates a block diagram of an example computer system/server adapted to implement an implementation mode of the present disclosure.

FIG. 5 illustrates a block diagram of an example computer system/server 012 adapted to implement an implementation mode of the present disclosure. The computer system/server 012 shown in FIG. 5 is only an example and should not bring about any limitation to the function and scope of use of the embodiments of the present disclosure.

As shown in FIG. 5, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in FIG. 5, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement the flow of the method according to an embodiment of the present disclosure.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure. For example, said one or more processors execute the flow of the method according to the embodiment of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A device list synchronizing method, wherein the method comprises:
   receiving a DeviceDiscoveryRequest including first authorization information and second authorization information by a developer system, the DeviceDiscoveryRequest including the first authorization information and the second authorization information being sent by a smart network system to the developer system after obtaining a user instruction instructing to discover devices, wherein the first authorization information is provided by the smart network system and the second authorization information is provided by the developer system;
   storing a correspondence relationship of the first authorization information and the second authorization information by the developer system; and
   in response to obtaining information of update of a device list on a developer side corresponding to the second authorization information, carrying, by the developer system according to the correspondence relationship, the first authorization information to invoke an interface of the smart network system to trigger the smart network system to send the DeviceDiscoveryRequest to the developer system.

2. The method according to claim 1, comprising:
   after receiving the DeviceDiscoveryRequest, the developer system obtaining the device list on the developer side corresponding to the second authorization information, and returning the device list on the developer side to the smart network system.

3. The method according to claim 1, wherein the first authorization information comprises user identification information or encrypted user identifier information.

4. A device list synchronizing method, wherein the method comprises:
   after obtaining, by a smart network system, a user instruction instructing to discover devices, the smart network system sending, to a developer system, a DeviceDiscoveryRequest including first authorization information and second authorization information so that the developer system stores a correspondence relationship of the first authorization information and the second authorization information, wherein the first authorization information is provided by the smart network system and the second authorization information is provided by the developer system; and
   in response to receiving, by the smart network system, an invocation including the first authorization information and sent by the developer system in response to obtaining information about a device list on a developer side corresponding to the second authorization information is updated and according to the correspondence relationship, sending the DeviceDiscoveryRequest to the developer system.

5. The method according to claim 4, wherein the method further comprises:
   after the smart network system receives the device list on the developer side from the developer system, using the device list on the developer side to update cloud user data of the smart network system.

6. The method according to claim 5, wherein the method further comprises:

returning a message about success or failure of update to user equipment sending the user instruction, according to an update result of the cloud user data of the smart network system.

7. The method according to claim 4, wherein the first authorization information comprises user identification information or encrypted user identifier information.

8. A device for synchronizing a device list for a developer system, comprising
one or more processors;
a memory;
one or more programs stored in the memory and configured to execute the following operation when executed by the one or more processors:
receiving a DeviceDiscoveryRequest including first authorization information and second authorization information, the DeviceDiscoveryRequest including the first authorization information and the second authorization information being sent by a smart network system to the developer system after obtaining a user instruction instructing to discover devices, wherein the first authorization information is provided by the smart network system and the second authorization information is provided by the developer system;
storing a correspondence relationship of the first authorization information and the second authorization information; and
in response to obtaining information of update of a device list on a developer side corresponding to the second authorization information, carrying the first authorization information according to the correspondence relationship to invoke an interface of the smart network system to trigger the smart network system to send the DeviceDiscoveryRequest to the developer system.

9. A non-transitory computer storage medium in which one or more programs are stored, when said one or more programs are executed by a developer system, the developer system being enabled to execute the following operations:
receiving a DeviceDiscoveryRequest including first authorization information and second authorization information, the DeviceDiscoveryRequest including the first authorization information and the second authorization information being sent by a smart network system to the developer system after obtaining a user instruction instructing to discover devices, wherein the first authorization information is provided by the smart network system and the second authorization information is provided by the developer system;
storing a correspondence relationship of the first authorization information and the second authorization information; and
in response to obtaining information of update of a device list on a developer side corresponding to the second authorization information, carrying the first authorization information according to the correspondence relationship to invoke an interface of the smart network system to trigger the smart network system to send the DeviceDiscoveryRequest to the developer system.

10. The device according to claim 8, wherein
the operation further comprises:
after receiving the DeviceDiscoveryRequest, obtaining the device list on the developer side corresponding to the second authorization information, and returning the device list on the developer side to the smart network system.

11. The device according to claim 8, wherein the first authorization information comprises user identification information or encrypted user identifier information.

12. A device for synchronizing a device list for a smart network system, comprising
one or more processors;
a memory;
one or more programs stored in the memory and configured to execute the following operation when executed by the one or more processors:
after obtaining a user instruction instructing to discover devices, sending, to a developer system, a DeviceDiscoveryRequest including first authorization information and second authorization information so that the developer system stores a correspondence relationship of the first authorization information and the second authorization information, wherein the first authorization information is provided by the smart network system and the second authorization information is provided by the developer system;
in response to receiving an invocation including the first authorization information and sent by the developer system in response to obtaining information about a device list on a developer side corresponding to the second authorization information is updated and according to the correspondence relationship, sending the DeviceDiscoveryRequest to the developer system.

13. The device according to claim 12, wherein the operation further comprises:
after the smart network system receives the device list on the developer side from the developer system, using the device list on the developer side to update cloud user data of the smart network system.

14. The device according to claim 13, wherein the operation further comprises:
returning a message about success or failure of update to user equipment sending the user instruction, according to an update result of cloud user data of the smart network system.

15. The device according to claim 12, wherein the first authorization information comprises user identification information or encrypted user identifier information.

16. The non-transitory computer storage medium according to claim 9,
the operation further comprises:
after receiving the DeviceDiscoveryRequest, obtaining the device list on the developer side corresponding to the second authorization information, and returning the device list on the developer side to the smart network system.

17. The non-transitory computer storage medium according to claim 9, wherein the first authorization information comprises user identification information or encrypted user identifier information.

18. A non-transitory computer storage medium in which one or more programs are stored, when said one or more programs are executed by a smart network system, the smart network system being enabled to execute the following operations:
after obtaining a user instruction instructing to discover devices, sending, to a developer system, a DeviceDiscoveryRequest including first authorization information and second authorization information so that the developer system stores a correspondence relationship of the first authorization information and the second authorization information, wherein the first authorization information is provided by the smart network system and the second authorization information is provided by the developer system; and in response to receiving an invocation including the first authorization information and sent by the developer system in response to obtaining information about a device list on a developer side corresponding to the second authorization information is updated and according to the correspondence relationship, sending the DeviceDiscoveryRequest to the developer system.

19. The non-transitory computer storage medium according to claim 18, wherein the operation further comprises:

after the smart network system receives the device list on the developer side from the developer system, using the device list on the developer side to update cloud user data of the smart network system.

20. The non-transitory computer storage medium according to claim 19, wherein the operation further comprises:

returning a message about success or failure of update to user equipment sending the user instruction, according to an update result of the cloud user data of the smart network system.

21. The non-transitory computer storage medium according to claim 18, wherein the first authorization information comprises user identification information or encrypted user identifier information.

* * * * *